(12) United States Patent
Breitmar et al.

(10) Patent No.: US 12,263,650 B2
(45) Date of Patent: Apr. 1, 2025

(54) DEVICE FOR ULTRASONIC WELDING OF COMPOSITE MATERIAL

(71) Applicant: SIG Services AG, Neuhausen am Rheinfall (CH)

(72) Inventors: Felix Breitmar, Mönchengladbach (DE); Thomas Hose, Datteln (DE); Stefan Zendler, Straubenhardt (DE)

(73) Assignee: SIG Services AG, Neuhausen am Rheinfall (CH)

( * ) Notice: Subject to any disclaimer, the term of this patent is extended or adjusted under 35 U.S.C. 154(b) by 0 days.

(21) Appl. No.: 18/694,172

(22) PCT Filed: Sep. 20, 2022

(86) PCT No.: PCT/EP2022/075996
§ 371 (c)(1),
(2) Date: Mar. 21, 2024

(87) PCT Pub. No.: WO2023/046644
PCT Pub. Date: Mar. 30, 2023

(65) Prior Publication Data
US 2024/0342998 A1     Oct. 17, 2024

(30) Foreign Application Priority Data
Sep. 22, 2021 (DE) ...................... 10 2021 124 530.3

(51) Int. Cl.
*B29C 65/08* (2006.01)
(52) U.S. Cl.
CPC .................................. *B29C 65/083* (2013.01)

(58) Field of Classification Search
CPC ...... B29C 65/08; B29C 65/083; B29C 65/085; B29C 65/086; B29C 65/087
(Continued)

(56) References Cited

U.S. PATENT DOCUMENTS 6,251,203 B1     6/2001  Vala et al.
8,887,784 B2 *  11/2014  Thaerigen ........... B29C 66/4312
                                                            156/580.2
(Continued)

FOREIGN PATENT DOCUMENTS

DE        29510274 U1    10/1995
DE        19526354 C1     1/1997
(Continued)

*Primary Examiner* — James D Sells
(74) *Attorney, Agent, or Firm* — The Webb Law Firm

(57) ABSTRACT

A device is shown and described for ultrasonic welding of composite material, in particular composite material of package sleeves and/or packages, including at least two tools for ultrasonic welding, in particular a sonotrode and an anvil. Each tool has a functional surface for contact with the material to be welded. The functional surfaces of the tools are aligned approximately parallel to one another in such a way that a gap with an approximately horizontal seam direction is created between the functional surfaces. The tools are mounted in such a way that the width of the gap can be changed by at least one of the tools being movable along a feed direction, and at least one joint having at least one axis of rotation about which one of the tools is rotatable. In order to enable optimal adaptation of the movably mounted tool—for example the sonotrode—to the materials to be welded and their size, it is proposed that the position of the axis of rotation can be changed.

16 Claims, 9 Drawing Sheets

(58) Field of Classification Search
USPC .................................................... 156/580.1
See application file for complete search history.

(56) References Cited

U.S. PATENT DOCUMENTS

2008/0105385 A1  5/2008  Wild et al.
2015/0274337 A1  10/2015 Beauvy et al.

FOREIGN PATENT DOCUMENTS

| | | |
|---|---:|---|
| DE | 10231742 B3 | 1/2004 |
| DE | 19581256 B4 | 6/2009 |
| DE | 102008004880 A1 | 7/2009 |
| DE | 102013100474 A1 | 7/2014 |
| EP | 1854618 B1 | 12/2012 |
| EP | 3092995 B1 | 1/2019 |
| WO | 2015104880 A1 | 7/2015 |

* cited by examiner

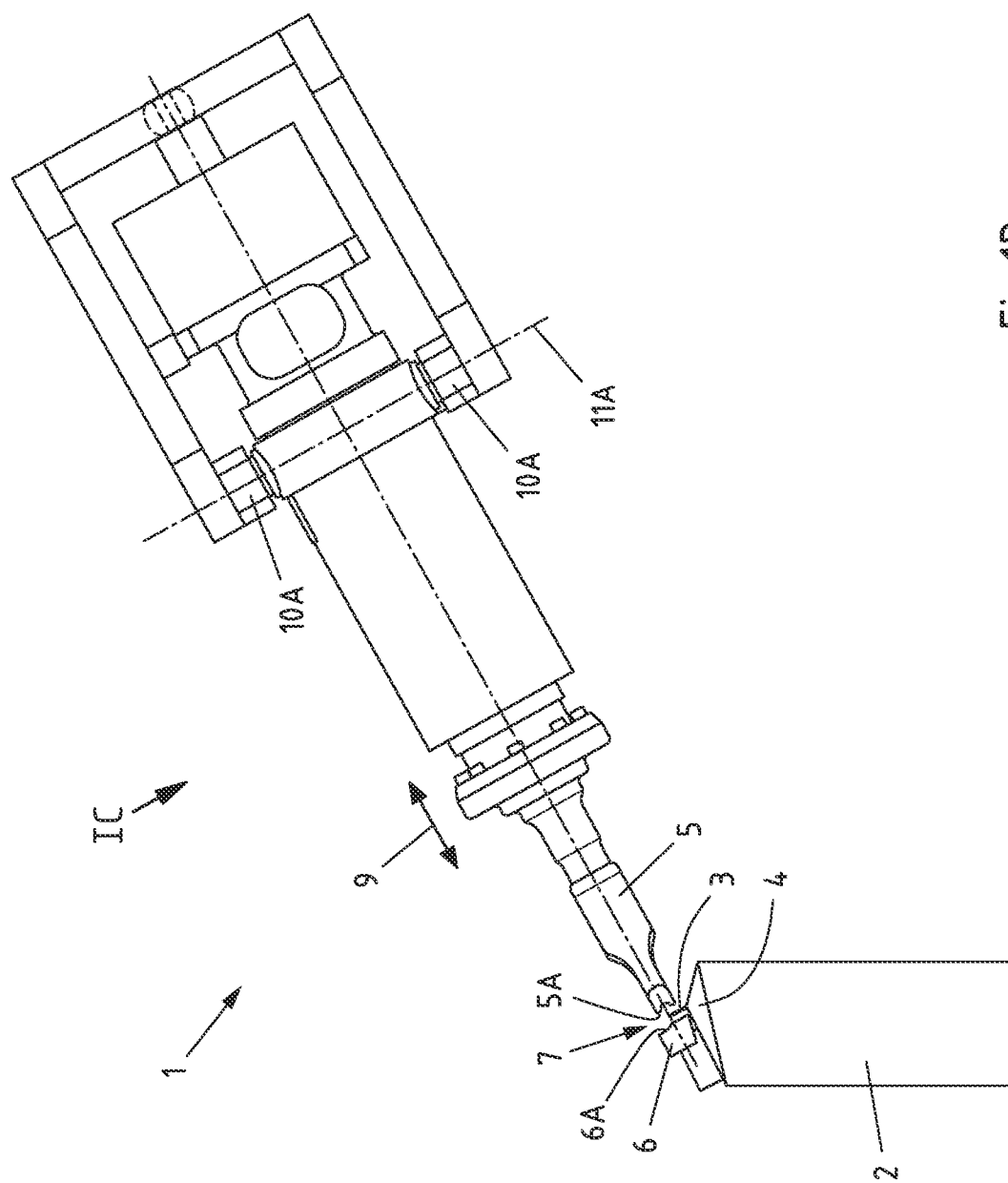

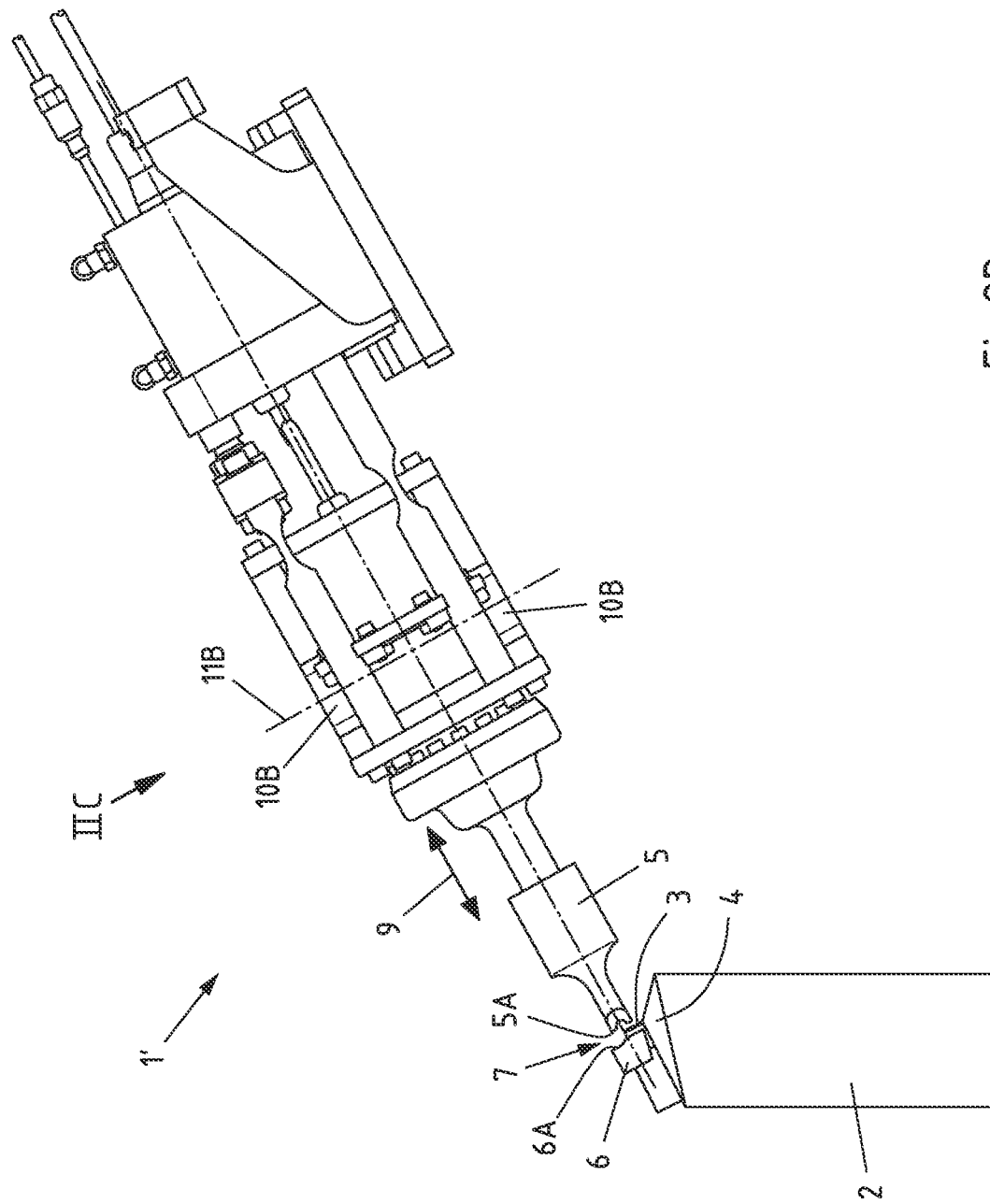

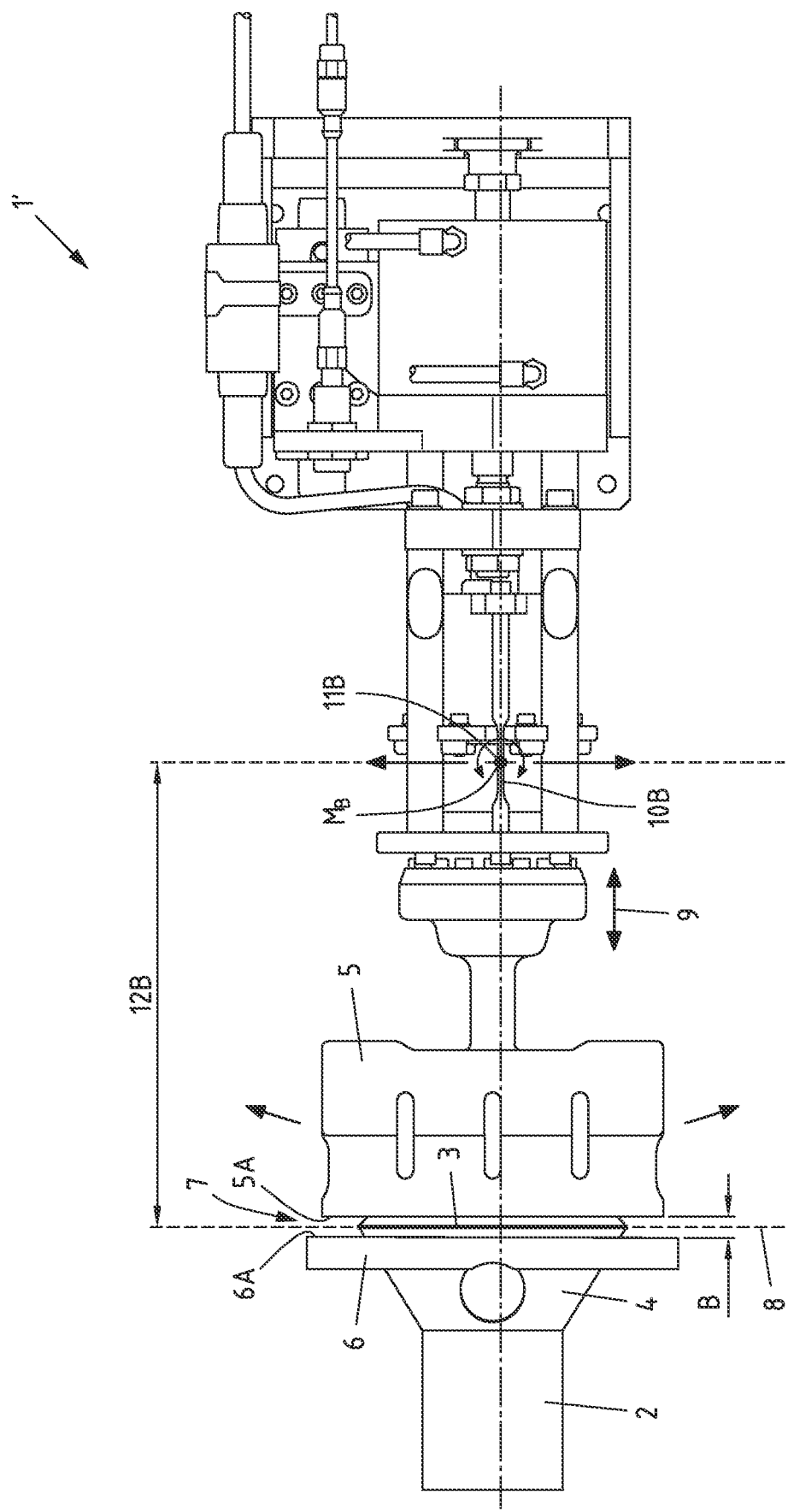

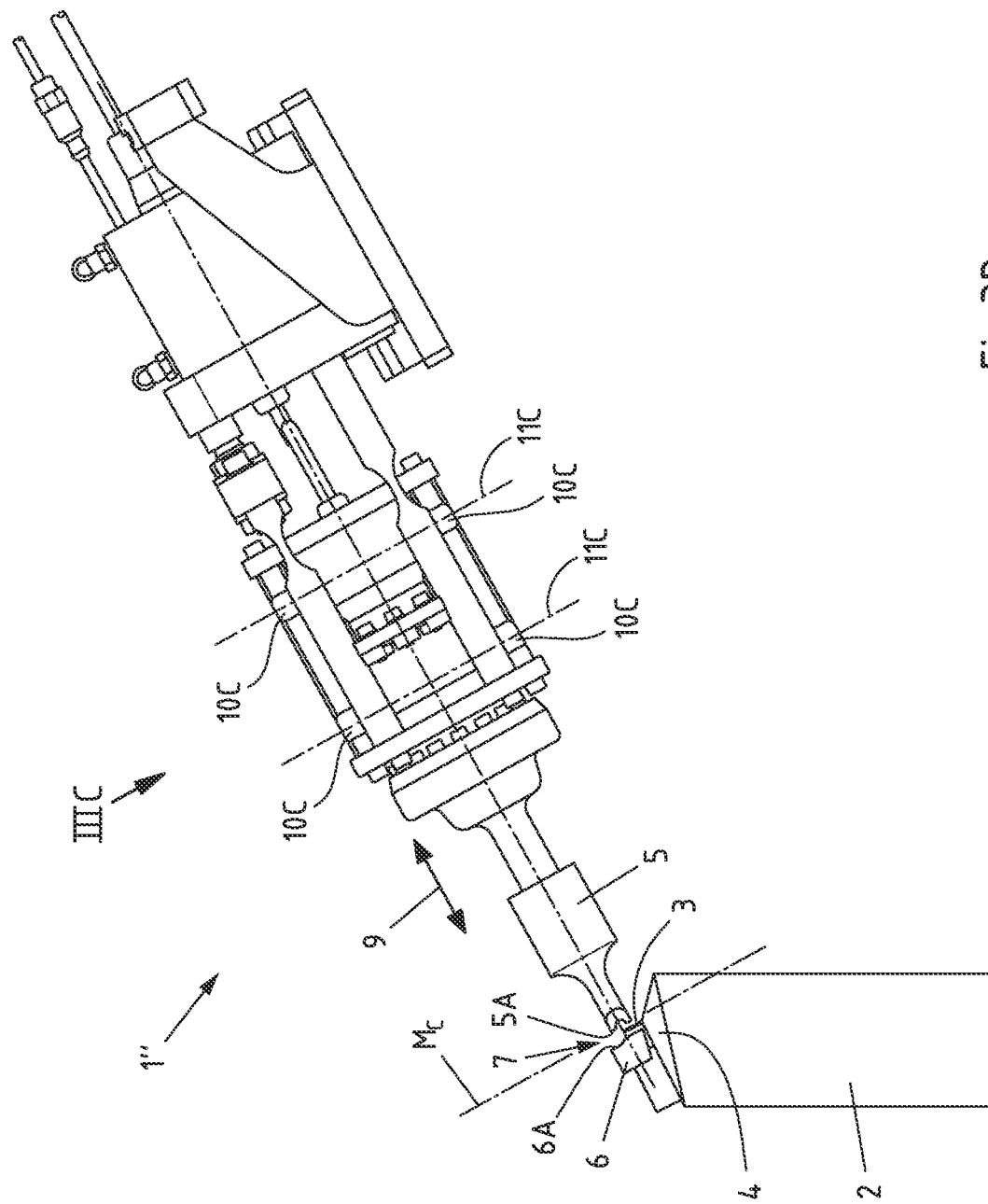

DEVICE FOR ULTRASONIC WELDING OF COMPOSITE MATERIAL

CROSS-REFERENCE TO RELATED APPLICATIONS

This application is the United States national phase of International Patent Application No. PCT/EP2022/075996 filed Sep. 20, 2022, and claims priority to German Patent Application No. 10 2021 124 530.3 filed Sep. 22, 2021, the disclosures of which are hereby incorporated by reference in their entireties.

BACKGROUND OF THE INVENTION

Field of the Invention

The invention relates to a device for ultrasonic welding of composite material, in particular composite material of package sleeves and/or packages, comprising: at least two tools for ultrasonic welding, in particular a sonotrode and an anvil, wherein each tool has a functional surface for contact with the material to be welded, wherein the functional surfaces of the tools are aligned approximately parallel to one another in such a way that a gap with a preferably approximately horizontal seam direction is created between the functional surfaces, wherein the tools are mounted in such a way that the width of the gap can be changed by at least one of the tools being movable along a feed direction, and at least one joint having at least one axis of rotation about which one of the tools is rotatable.

Description of Related Art

Packages can be manufactured in different ways and from an extremely wide range of materials. A widely used possibility for their manufacture consists of producing a blank from the package material from which, through folding and further steps, first a package sleeve and finally a package is produced. Among other things, this manufacturing method has the advantage that the blanks are very flat and can therefore be stacked in a manner which saves space. In this way, the blanks or package sleeves can be manufactured in a different location to that where the folding and filling of the package sleeves takes place. Composite materials are frequently used as material, for example a composite consisting of a plurality of thin layers of paper, cardboard, plastic and/or metal, in particular aluminium. Such packages are widely used in the foodstuffs industry in particular.

Numerous devices and methods are known in the field of packaging technology with which flat-folded package sleeves can be unfolded, closed on one side, filled with contents and then completely closed.

Closing the package sleeves represents a particular challenge because a reliable sealing of the package sleeves must be achieved by means of the closing, and this must also withstand subsequent transport and other stresses. One possibility for closing package sleeves is to weld the seams of the package sleeve. This can take place by means of an ultrasonic welding process, for example. In an ultrasonic welding process, two interacting tools—a sonotrode and an anvil—are arranged in such a way that a narrow gap is created between the effective areas of these tools. The package sleeves can now be guided into the gap with the region to be welded and welded there.

The welding process takes place by the sonotrode transmitting its ultrasonic vibrations to the area of the package sleeve to be welded (usual frequency range of ultrasonic vibrations: 20 kHz to 10 GHz). This requires a specific contact force depending on the structure and thickness of the material to be welded as well as the contact zones on the anvil and sonotrode and the frequency set. The energy introduced into the package sleeve in this way leads to a melting and bonding ("welding") of the inner material layer, which is often a layer made of thermoplastic.

A distinction can be made between continuous and discontinuous—i.e. pulsed—ultrasonic welding methods and the welding devices known for this purpose.

In continuous ultrasonic welding processes, the sonotrode and the anvil are often designed as counter-rotating tools, between which a narrow gap is created through which the package sleeves are continuously passed through with the area to be welded. Due to the rotating or rolling movement of the tools (sonotrode, anvil), ultrasonic welding processes of this type are also referred to as roller seam welding processes. Continuous ultrasonic welding methods are known, for example, from DE 295 10 274 U1 or DE 10 2013 100 474 A1.

Due to the rotating tools, continuous ultrasonic welding processes of this type have the advantage that continuous welding can take place. The material to be welded can therefore be fed through the ultrasonic welding system without interruption. In addition, with many of the known devices, the gap width between the tools can be actively adjusted—i.e. by the user of the system—and thus adapted to the thickness of the materials to be welded.

However, a disadvantage of continuous devices and methods of this type is that a passive adjustment of the gap width during the welding process—i.e. triggered by the material to be welded—is not possible at all or is only possible in an unsatisfactory manner. A change in the gap width during the welding process may be necessary, for example, if several materials to be welded are not lined up seamlessly together, but are guided through the gap at a distance from each other. This can, for example, be the case with package sleeves which are moved by a conveyor belt. It may also be necessary to change the gap width if the material thickness of the materials to be welded changes. This can also occur in package sleeves, for example in the region of overlapping material layers.

In discontinuous (also: "cycle-based") ultrasonic welding processes, the sonotrode and the anvil are often mounted in such a way that they can be pressed together and pulled apart, whereby the size of the gap created between the two tools changes. When open, the materials to be welded can be inserted into the gap. When the desired position is reached, the gap width is reduced by pressing the sonotrode and anvil together so that the welding process can begin. After the welding process is complete, the gap width is increased again so that the welded materials can be removed from the gap. This process is often repeated in the same sequence and duration, which is why it is referred to as "cycle-based" operation.

One advantage of discontinuous ultrasonic welding methods of this type is that many important process parameters (e.g. the height and distribution of the contact pressure) can be set more precisely than with one of the previously described continuous ultrasonic welding methods. It is also possible to adapt the sonotrode and the anvil very precisely to the materials to be welded and for example also to weld materials that have different material thicknesses in different areas, for example package sleeves with overlapping material layers in areas (e.g. in the area of a seam that has already been welded). The adaptation of the tools is possible because each area of the tools is assigned to a defined area of the material to be welded or the weld seam to be created and the entire weld seam is not created by rolling tools that remain the same in the circumferential direction.

However, a challenge with discontinuous ultrasonic welding processes is to achieve homogeneous pressure distribution even if the welding tools deflect or sag. The cause of the deflection can be, for example, the anvil or the sonotrode or the suspension or carriers bending under the load of the welding forces. In order to be able to react to changes of this type, the functional surfaces of the tools should be able to react to the change and also adjust position and/or orientation.

Various attempts at a solution are already known for this, for example from EP 1 854 618 B1. In the ultrasonic welding device shown there, the anvil is mounted on a parallel lever formed from two levers and can be moved in the direction of the sonotrode and back, whereby the functional surfaces of both tools remain in parallel. The anvil can also be rotated about a vertical axis. However, this type of anvil mounting also only permits limited mobility, namely a translational movement along an axis (that cannot be changed) and a rotational movement about an axis (that cannot be changed).

SUMMARY OF THE INVENTION

Against this background, the object underlying the invention is to design and further develop a device described at the outset and explained in greater detail above in such a way that the tools and their functional surfaces can react flexibly to dynamic changes during the welding process in order to keep the pressure distribution and thus the energy input along the weld seam constant and thus achieve a good welding result.

This object is achieved by means of a device as described herein in that the position of the axis of rotation is changeable.

The device according to the invention is a device for the ultrasonic welding of composite material, in particular composite material of package sleeves and/or packages. The device is initially characterised by at least two tools for ultrasonic welding, in particular by a sonotrode and by an anvil. By providing two or more tools, the materials to be welded can be processed simultaneously from several sides without having to be turned for this purpose. Each tool has a functional surface for contact with the material to be welded. The functional surface is understood to mean the surface that acts on the package sleeves and/or packages. The action of the functional surfaces on the package sleeve or the package can for example occur by means of touch (e.g. by pressure). The functional surfaces of the tools are aligned approximately parallel to one another in such a way that a gap with a preferably approximately horizontal seam direction is created between the functional surfaces. This makes it possible, for example, to create horizontally running (weld) seams, for example for closing the gable region of packages. The tools are mounted in such a way that the width of the gap can be changed by moving at least one of the tools along a feed direction. The feed direction is the direction along which the tool can be moved to reduce and increase the gap. This can in particular mean an "active" adjustment of the gap, i.e. effected by the user of the device. This adjustment usually takes place when the device is stationary, for example when changing the material to be welded. When both tools are pressed together, the gap width is determined by the thickness of the composite material to be welded between the tools. The device also has at least one joint with at least one axis of rotation about which one of the tools can be rotated. This rotatable bearing enables a "passive" adjustment or adjustment of the tool, i.e. caused by the material to be processed.

The device according to the invention is characterised in that the position of the axis of rotation can be changed. By changing the position of the rotational axis, the device and in particular the movably mounted tool (for example the sonotrode) can be optimally adjusted to the materials to be welded and their size. The adjustability can for example be achieved in that the joint can be displaced relative to the other device and can be fixed in different positions. The intention is therefore above all an adjustability of the joint and thus a changeability of the position of the axis of rotation before and/or after the welding process, not during the welding process; presetting should therefore be possible. A changeability of the position of the axis of rotation can also be used to change the position of the instantaneous centre of rotation of the movably mounted tool, for example the sonotrode. The adjustment of the position of the axis of rotation can for example take place with the aim of achieving a mechanical equilibrium, in particular a torque equilibrium, by means of which the movably mounted tool can be operated in an equilibrium state which ensures that the welding pressure along the seam is constant.

According to an embodiment of the device, the axis of rotation runs orthogonal to the feed direction and/or orthogonal to the seam direction. The seam direction often (but not necessarily) runs approximately horizontally and the feed direction runs either also horizontally or slightly inclined relative to a horizontal plane. As a result, the axis of rotation is either vertical (for the horizontal feed direction) or slightly inclined relative to a vertical plane (for the inclined feed direction). In the case of an approximately vertical axis of rotation, the movably mounted tool, for example the sonotrode, can be moved (in sections) along a substantially horizontal circular path. As a result, the height of the sonotrode hardly changes during a (rotary) movement, so that weld seams with a constant height can be created. Nevertheless, it may be necessary to slightly tilt the feed direction (relative to the horizontal) so that the axis of rotation is also slightly tilted (relative to the vertical). Due to the inclination of the device, it is in particular possible to ensure that the packages can be guided into the device and back out of the device without a collision. In addition, an inclination of the device can be advantageous for packages with an inclined rising gable and/or with a screw closure.

According to a further embodiment of the device, the position of the axis of rotation can be displaced along the seam direction. By shifting the axis of rotation along the seam direction, the device and in particular the movably mounted tool (for example the sonotrode) can be optimally adjusted to the shape and length of the seam. The movability can for example be achieved in that the joint can be displaced relative to the other device and can be locked in different positions. Above all, it should be possible to move the position of the axis of rotation before and/or after the welding process, not during the welding process; presetting should therefore be possible. As previously described, the position of the instantaneous centre of rotation of the movably mounted tool (for example the sonotrode) can be changed by shifting the axis of rotation. In addition, a mechanical equilibrium, in particular a torque equilibrium, can be achieved by means of which the movably mounted tool can be operated in an equilibrium state which ensures that the welding pressure along the seam is constant.

According to a further embodiment of the device, it is provided for the distance between the axis of rotation and the gap to be less than 50 cm, in particular less than 10 cm, preferably less than 5 cm. The distance between the axis of rotation and the gap influences the type of movement of the tool (for example the sonotrode) in the area of the gap. The greater the distance, the greater the proportion of the translational motion component and the smaller the proportion of the rotational motion component. The possibility of rotation is often desirable to allow for angular compensation, whereas a translational shift in the area of the seam is rather undesirable, as it can impair the quality of the weld. The specified maximum distances ensure that the translational displacement in the area of the seam is limited to an acceptable level.

According to a further embodiment of the device, the joint has a hinge joint. A hinge joint or pivoting joint enables a rotational movement about an axis of rotation and therefore allows a degree of freedom of movement. The joint can either have only one hinge joint—i.e. consist of one hinge joint—or have a plurality of hinge joints.

According to a further embodiment of the device, the joint has a solid-state joint, in particular a leaf spring. A solid-state joint is a joint in which mobility is achieved by a certain area of the joint having reduced bending stiffness and being able to be elastically deformed ("rotation by bending"). The reduced bending stiffness can be achieved, for example, by a local reduction of the cross-sectional area. Solid-state joints are characterised by a simple and robust design and also have the advantage of being operated without lubricants and thus maintenance-free. Solid-state joints often only have a limited rotational angle range, but this is sufficient for some applications such as the mounting of a sonotrode. One type of such a solid-state joint is a leaf spring. In addition to the aforementioned advantages, leaf springs have the useful property that they generate return forces in the opposite direction of the deflection direction when deflected, which move the leaf spring back to the non-deflected initial position. The joint can either have only one solid-state joint—i.e. consist of one solid-state joint—or have several solid-state joints.

According to a further embodiment of the device, it is provided for the joints to form a multi-part gearbox. By means of multi-part gearboxes, i.e. gearboxes with several parts coupled to one another, particularly complex (overall) motion paths can be executed by the superimposition of several (individual) motion paths. In addition, the position of the instantaneous centre of rotation can be adjusted very flexibly, in particular the instantaneous centre of rotation does not have to lie on one of the axes of rotation of the individual joints. For this embodiment, it is further proposed that gearboxes have a plurality of solid-state joints, in particular a plurality of leaf springs. By forming a multi-part gearbox from a plurality of solid-state joints, in particular from a plurality of leaf springs, the aforementioned advantages of multi-part gearboxes (complex motion paths) can be combined with the aforementioned advantages of leaf springs (simple, robust, lubricant-free).

According to a further embodiment of the device, the tool mounted rotatably about the joint has an instantaneous centre of rotation, the distance of which from the gap is less than 10 cm, in particular less than 5 cm, preferably less than 1 cm. The distance between the instantaneous centre of rotation of the tool and the gap influences the type of movement of the tool (for example the sonotrode) in the area of the gap. The greater the distance, the greater the proportion of the translational motion component and the smaller the proportion of the rotational motion component. The possibility of rotation is often desired to enable angular compensation; on the other hand, a translational displacement (i.e. a relative movement of the sonotrode to the anvil and composite material or of the anvil to the sonotrode and composite material) in the area of the seam is rather undesirable, as it can impair the quality of the weld. The specified maximum distances ensure that the translational displacement in the area of the seam is limited to an acceptable level. The closer the instantaneous centre of rotation is to the weld seam, the better the automatic compensation works because it is less obstructed by friction.

According to a further embodiment of the device, it is finally provided that the tool rotatably mounted about the joint has an instantaneous centre of rotation, the distance of which from the gap is less than the distance between the axis of rotation and the gap. An instantaneous centre of rotation located particularly close to the gap can be achieved in particular by the tool having a bearing in which the instantaneous centre of rotation does not run through one of the axes of rotation of the joints, but instead lies next to it. In this way—i.e. due to the separation of the instantaneous centre of rotation and axis of rotation—the instantaneous centre of rotation can be arranged even closer to the gap than the joints can be arranged.

BRIEF DESCRIPTION OF THE DRAWINGS

The invention will be explained in more detail below with reference to a drawing which represents only one preferred exemplary embodiment, in which:

FIG. 1B: shows the device from FIG. 1A in a side view, FIG. 2B: shows the device from FIG. 2A in a side view, FIG. 2C: shows the device from FIG. 2A in a plan view from the view shown in FIG. 2B viewing direction IIC, FIG. 3B: shows the device from FIG. 3A in a side view

DESCRIPTION OF THE INVENTION

Figure 1A:
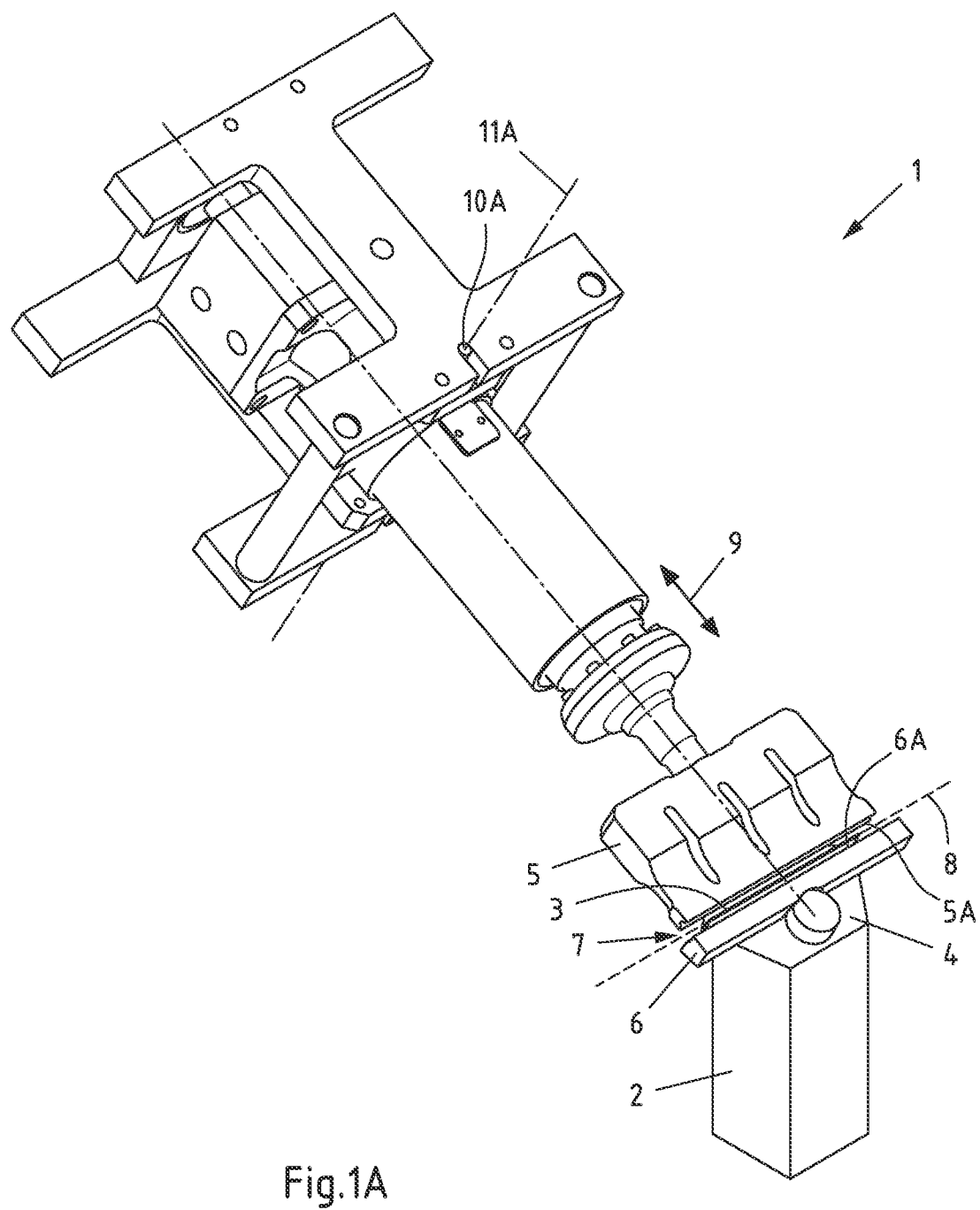
FIG. 1A is a first embodiment of a device according to the invention in a perspective view.
Figure 1C:
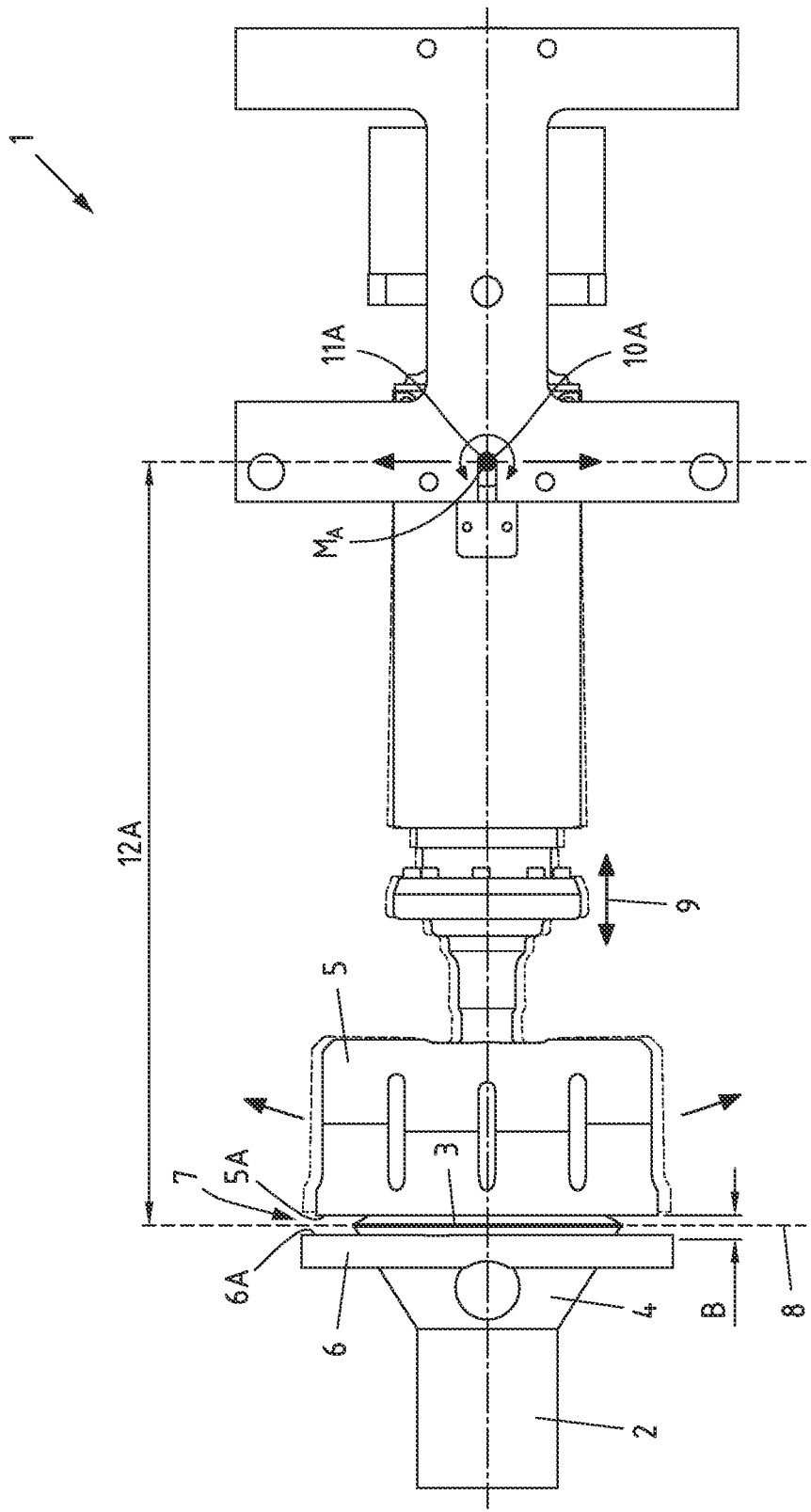
FIG. 1C: shows the device from FIG. 1A in a plan view from the view shown in FIG. 1B viewing direction IC.

FIG. 1A shows a first embodiment of a device 1 according to the invention in a perspective view. FIG. 1B shows the device 1 from FIG. 1A in a side view. FIG. 1C shows the device 1 from FIG. 1A in a plan view from the view shown in FIG. 1B viewing direction IC. In the case of the device 1 shown in FIG. 1A to FIG. 1C, it is a device for ultrasonic welding of composite material, in particular composite material of a package 2. In particular, seams of the package 2 can be welded and thus sealed in a manner that is liquid-tight, for example a seam 3 in the gable region 4 of the package 2. The device 1 has two tools for ultrasonic welding, in the present case a sonotrode 5 and an anvil 6. Both tools—i.e. both the sonotrode 5 and the anvil 6—have a functional surface 5A, 6A for contact with the material to be welded. The functional surfaces 5A, 6A of the tools (sonotrode 5, anvil 6) are aligned approximately parallel to one another in such a way that a gap 7 with an approximately horizontal seam direction 8 is created between the functional surfaces 5A, 6A (the seam direction 8 is represented by a dashed line). Both tools (sonotrode 5, anvil 6) are also mounted in such a way that the width B (see FIG. 1C) of the column 7 can be changed by moving at least one of the tools along a feed direction 9. The device 1 shown in FIG. 1A to FIG. 1C also has a joint 10 with an axis of rotation 11A, about which one of the tools can be rotated. The position of the axis of rotation 11A can be displaced along the seam direction 8 (represented by arrows in FIG. 1C), so that the sonotrode 5 can be optimally positioned.

The joint 10 is designed as a hinge joint 10A and the axis of rotation 11A runs through the hinge joint 10A. As a result, the movably mounted tool (in this case: the sonotrode 5) can be rotated around the hinge joint 10A and its axis of rotation 11A and thus has an instantaneous centre of rotation $M_A$ which lies on the axis of rotation 11A. There is a distance 12A between the hinge joint 10A or its axis of rotation 11A or the instantaneous centre of rotation $M_A$ and the gap 7. The distance 12A therefore represents a radius about which the sonotrode 5 can rotate back and forth (in sections) (indicated by the dashed outline of the sonotrode 5 in FIG. 1C). The greater the distance 12A, the greater the translational portion of the movement of the sonotrode 5 in the area of the weld seam, so that even a small rotational angle results in a rather large movement in the circumferential direction along a circular path around the instantaneous centre of rotation $M_A$. This means that even a small "angle correction" of the sonotrode 5 during the welding process would result in a rather large displacement of the sonotrode 5 in the seam direction 8. Since the permissible displacement along the seam direction 8 is limited but an angle correction of the sonotrode 5 is nevertheless desired, a distance 12A that is as small as possible is the goal.

Figure 2A:
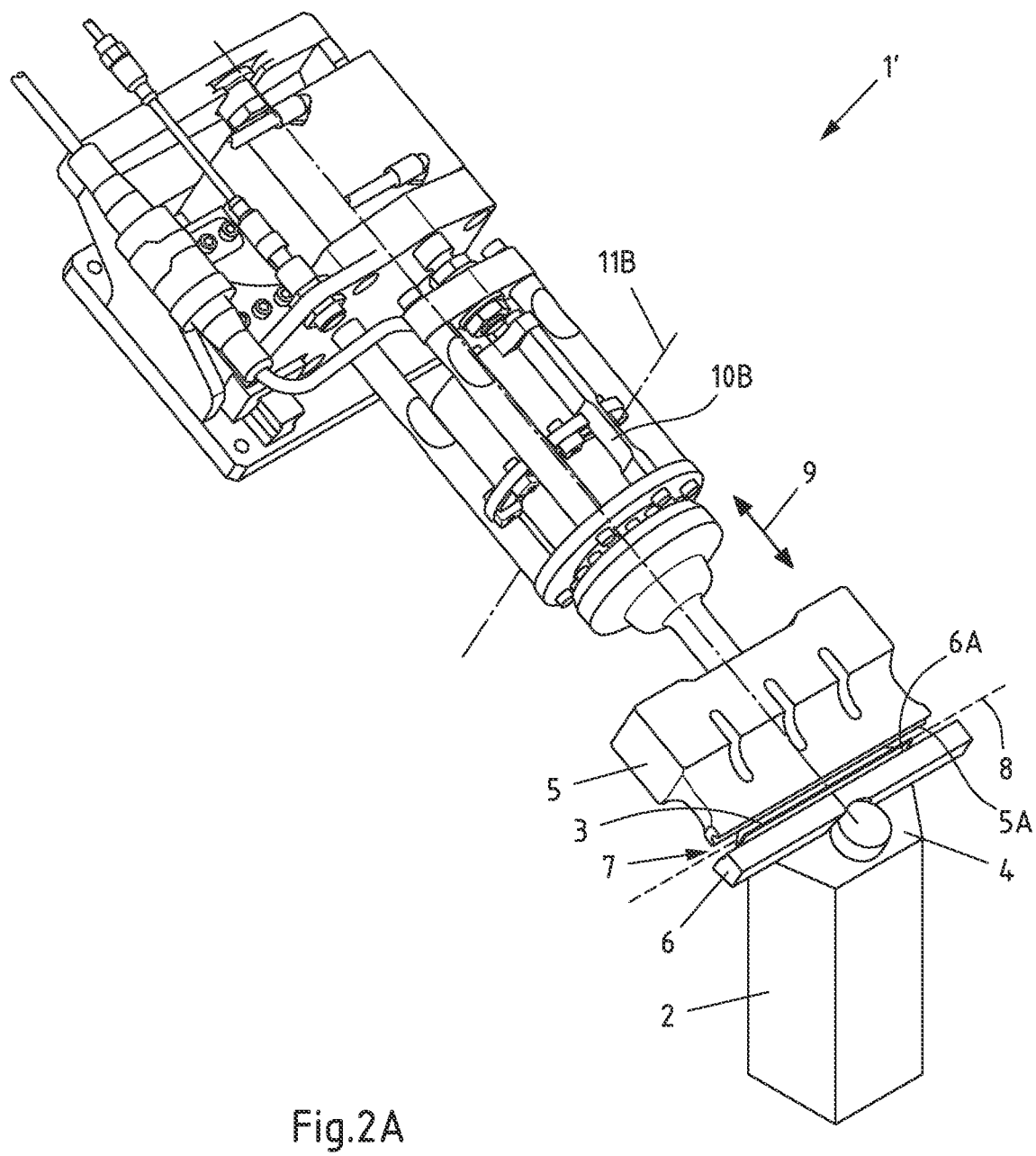
FIG. 2A: is a second embodiment of a device according to the invention in a perspective view.

FIG. 2A shows a second embodiment of a device 1' according to the invention 'in a perspective view. FIG. 2B shows the device 1' from FIG. 2A in a side view. FIG. 2C shows the device 1' from FIG. 2A in a plan view from the view shown in FIG. 2B viewing direction IIC. Corresponding reference symbols are used in FIG. 2A to FIG. 2C for those regions of the device 1' which are already in described in connection with FIG. 1A to FIG. 1C. A significant difference between the first embodiment of the device 1 (FIG. 1A to FIG. 1C) and the second embodiment of the device 1' (FIG. 2A to FIG. 2C) lies in the type and position of the joint 10. Instead of the hinge joint 10A described above, the joint 10 is designed as a solid-state joint, in particular as a leaf spring 10B, in the second embodiment of the device 1'. In addition to their simple and robust design, leaf springs have the advantage that they generate return forces in the opposite direction to the deflection direction when deflected, which moves the leaf spring back to the non-deflected initial position. A further difference lies in the fact that the leaf spring 10B is arranged closer to the gap 7 in such a way that a reduced distance 12B is achieved compared to the first embodiment.

In the second embodiment, the axis of rotation 11B also runs through the joint 10, i.e. the leaf spring 10B. This also has the consequence here that the sonotrode 5 can be rotated about the leaf spring 10B and its axis of rotation 11B and the sonotrode 5 thus has an instantaneous centre of rotation $M_B$, which lies on the axis of rotation 11B. There is a distance 12B between the leaf spring 10B or its axis of rotation 11B or the instantaneous centre of rotation $M_B$ and the gap 7. The distance 12B represents a radius about which the sonotrode 5 can rotate back and forth (in sections).

Figure 3A:
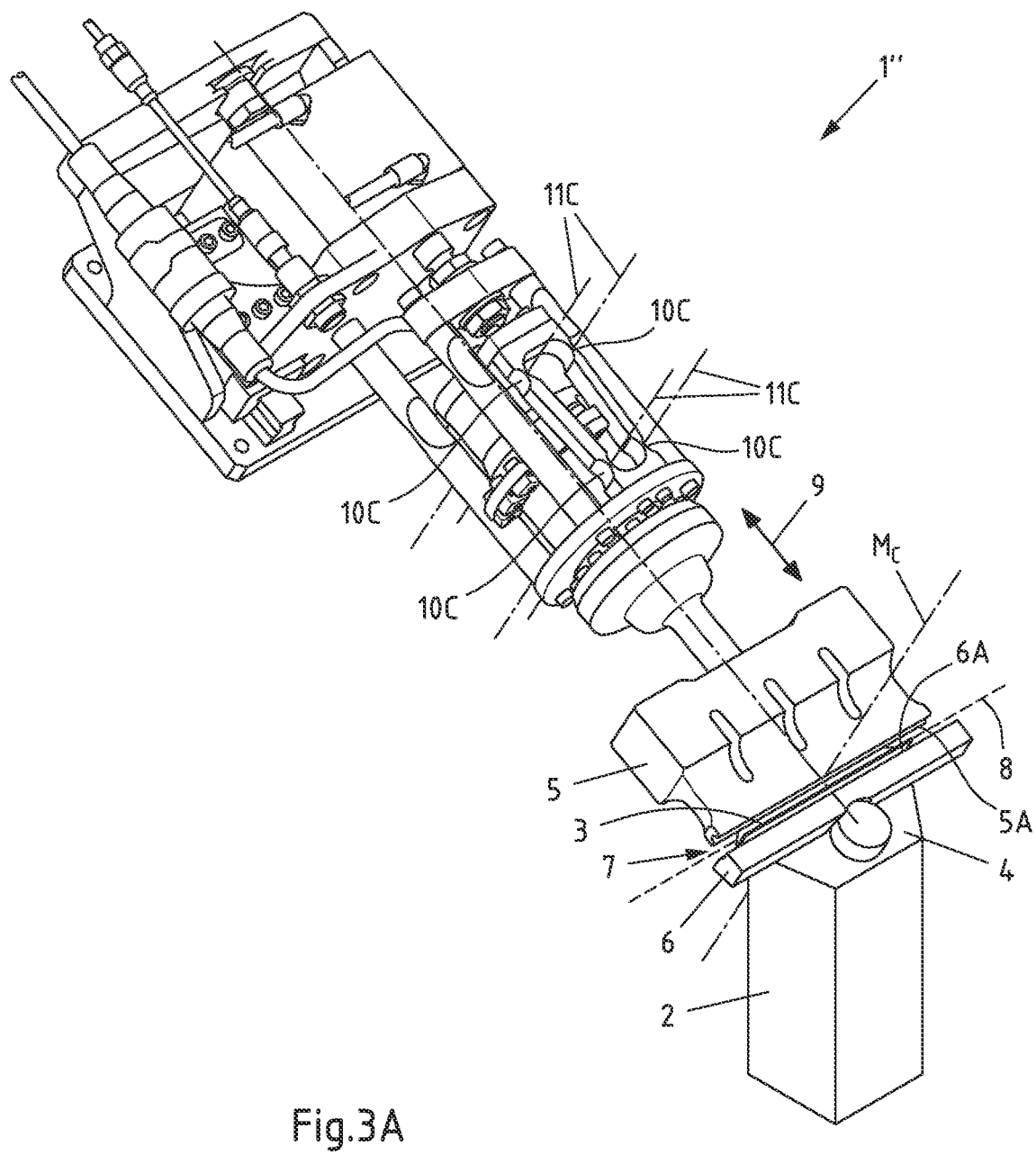
FIG. 3A: is a third embodiment of a device according to the invention in a perspective view.
Figure 3C:
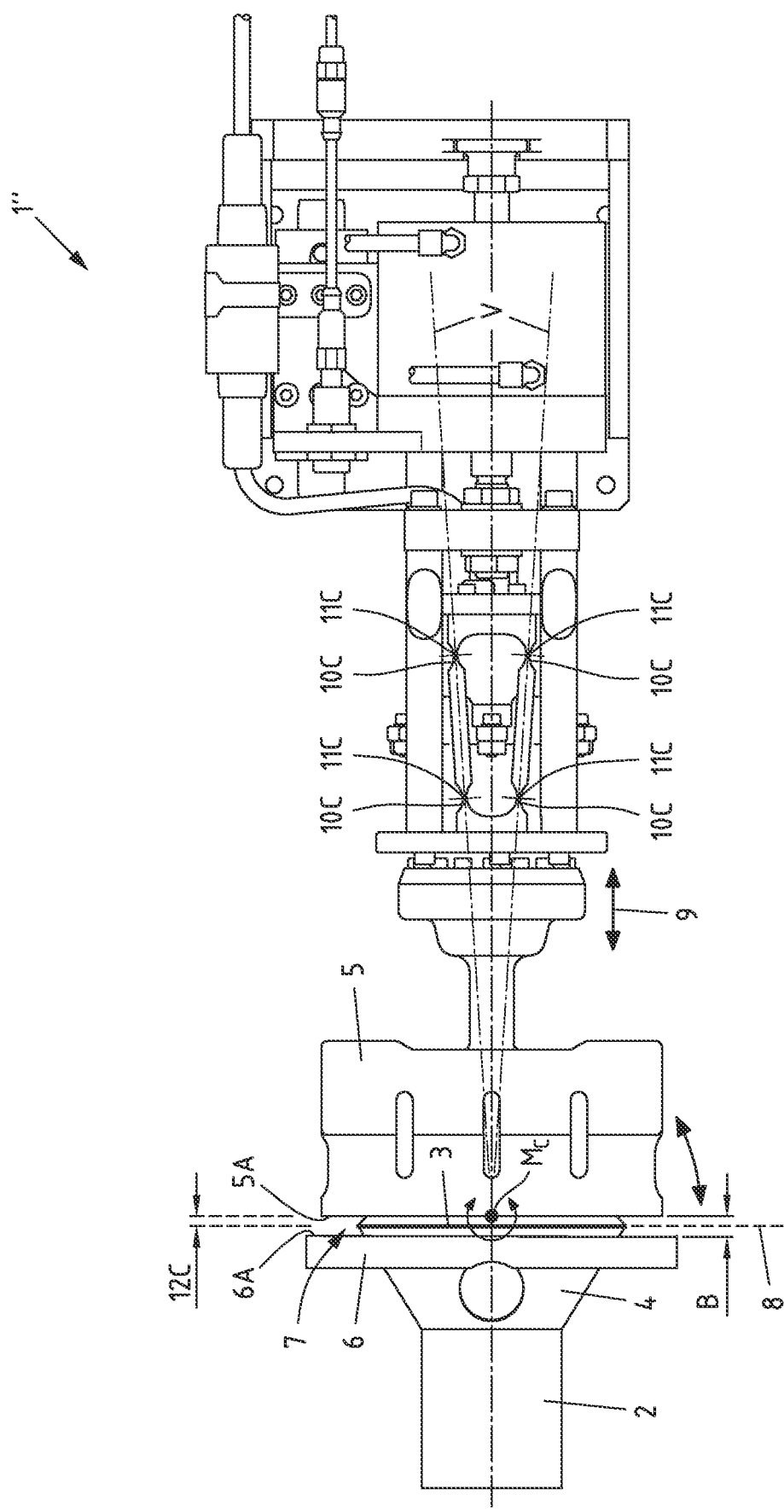
FIG. 3C: shows the device from FIG. 3A in a plan view from the view shown in FIG. 3B viewing direction IIIC.

FIG. 3A shows a third embodiment of a device 1'' according to the invention in a perspective view. FIG. 3B shows the device 1'' from FIG. 3A in a side view. FIG. 3C shows the device 1'' from FIG. 3A in a plan view from the view shown in FIG. 3B viewing direction IIIC. Corresponding reference symbols are used in FIG. 3A to FIG. 3C for those regions of the device 1'' which are already in described in connection with FIG. 1A to FIG. 2C. A significant difference between the third embodiment of the device 1'' (FIG. 3A to FIG. 3C) and the two previously described embodiments (FIG. 1A to FIG. 2C) in turn lies in the type and position of the joint 10.

In the third embodiment of the device 1'', the joint 10 has four solid-state joints, which are formed as leaf springs 10C. Together, the leaf springs 10C form a four-part gearbox, which enables a particularly advantageous movement of the sonotrode 5. Leaf springs are characterised by a simple and robust design and move automatically back from any deflected position to the non-deflected starting position. Another difference lies in the position of the instantaneous centre of rotation $M_C$ of the sonotrode 5. In contrast to the embodiments previously described, the instantaneous centre of rotation $M_C$ of the sonotrode 5 in the third embodiment of the device 1'' does not lie on one of the axes of rotation 11C of the individual leaf springs 10C, but rather much closer to the gap 7, whereby the distance 12C can be significantly reduced and even be zero (the instantaneous centre of rotation $M_C$ would then lie in the gap 7). The position of the instantaneous centre of rotation $M_C$ can be clarified using FIG. 3C: the instantaneous centre of rotation $M_C$ lies at the intersection of the connecting axes V of the axes of rotation 11C of the individual leaf springs 10C. The position and alignment of the individual leaf springs 10C or their axes of rotation 11C can thus specifically influence and optimise the position of the instantaneous centre of rotation $M_C$ of the sonotrode 5. An instantaneous centre of rotation $M_C$ which is very close to the gap 7 or even in the gap 7 has the consequence that the sonotrode 5 behaves as if it were mounted on a pivoting joint which is "in the weld seam". This enables the sonotrode 5 to rotate "about the weld seam" without performing an undesired displacement in the seam direction. In other words, in the area of the weld seam, the sonotrode 5 performs almost exclusively a rotational movement (desired for an angle correction); however, it performs almost no translational movement there (undesired due to a deterioration of the welding outcome).

LIST OF REFERENCE NUMERALS

1, 1', 1'': Device for ultrasonic welding
2: Packaging
3: Seam
4: Gable area
5: Sonotrode
5A: Functional surface (of the sonotrode 5)
6: Anvil
6A: Functional surface (of the anvil 6)
7: Gap
8: Seam direction
9: Feed direction
10: Joint
10A: Hinge joint
10B, 10C: Leaf spring
11A, 11B, 11C: Axis of rotation
12A, 12B, 12C: Distance
B: Width (of the gap 7)
$M_A$, $M_B$, $M_C$: Instantaneous centre of rotation
V: Connecting axis

The invention claimed is:

1. A device for ultrasonic welding of composite material comprising
    at least two tools for ultrasonic welding comprising a sonotrode and an anvil,
    wherein each tool has a functional surface for contact with the material to be welded,
    wherein the functional surfaces of the tools are aligned approximately parallel to one another such that a gap with an approximately horizontal seam direction is created between the functional surfaces,
    wherein the tools are mounted in such a way that the width of the gap can be changed by moving at least one of the tools along a feed direction,
    at least one joint with at least one axis of rotation about which one of the tools can be rotated, and
    wherein the position of the axis of rotation can be changed,
    wherein the position of the axis of rotation can be displaced along the seam direction and the displaceability is achieved in that the joint can be displaced relative to the rest of the device and can be locked in different positions.

2. The device according to claim 1, wherein the axis of rotation runs orthogonal to the feed direction and/or orthogonal to the seam direction.

3. The device according to claim 1, wherein the distance between the axis of rotation and the gap is less than 50 cm.

4. The device according to claim 1, wherein the joint has a hinge joint.

5. The device according to claim 1, wherein the joint has a solid-state joint.

6. The device according to claim 1, wherein the joints form a multi-part gearbox.

7. The device according to claim 6, wherein the gearbox has a plurality of solid-state joints.

8. The device according to claim 1, wherein the tool rotatably mounted around the joint has an instantaneous centre of rotation, the distance of which from the gap is less than 10 cm.

9. The device according to claim 1, wherein the tool rotatably mounted around the joint has an instantaneous centre of rotation, the distance of which from the gap is less than the distance between the axis of rotation and the gap.

10. The device according to claim 1, wherein the distance between the axis of rotation and the gap is less than 10 cm.

11. The device according to claim 1, wherein the distance between the axis of rotation and the gap is less than 5 cm.

12. The device according to claim 1, wherein the tool rotatably mounted around the joint has an instantaneous centre of rotation, the distance of which from the gap is less than 5 cm.

13. The device according to claim 1, wherein the tool rotatably mounted around the joint has an instantaneous centre of rotation, the distance of which from the gap is less than 1 cm.

14. The device according to claim 1, wherein the composite material is package sleeves and/or packages.

15. The device according to claim 5, wherein the joint is a leaf spring.

16. The device according to claim 7, wherein the solid-state joints are leaf springs.

* * * * *